Nov. 8, 1960 A. R. KOSMA 2,959,094
PROJECTOR FOR ANIMATED ADVERTISING DISPLAYS
Filed Nov. 14, 1955
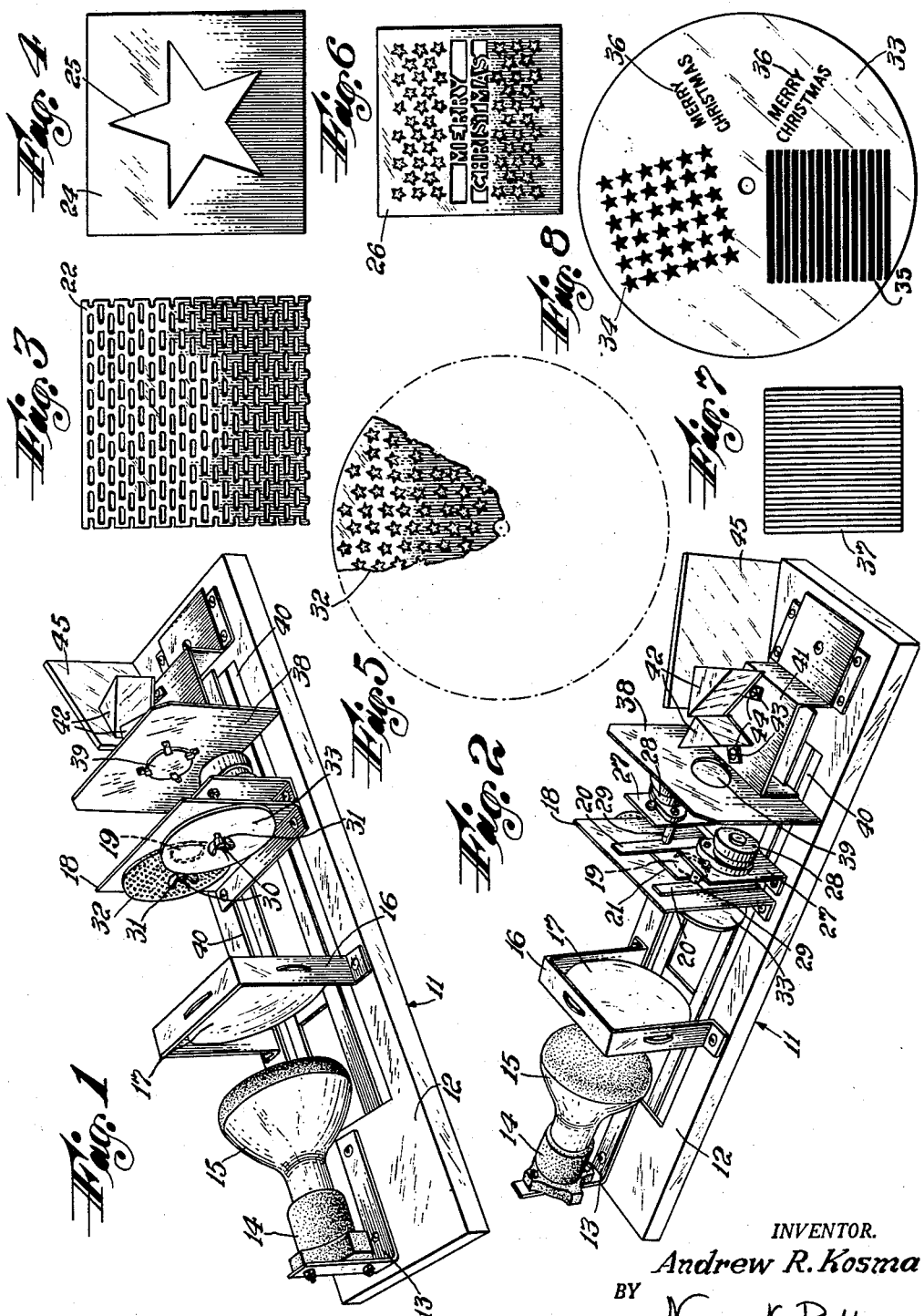
INVENTOR.
Andrew R. Kosma
BY
Norman K. Popper
ATTORNEY

United States Patent Office 2,959,094
Patented Nov. 8, 1960

2,959,094

PROJECTOR FOR ANIMATED ADVERTISING DISPLAYS

Andrew R. Kosma, Parsippany-Troy Hills, N.J.
(91 Florence Ave., Leonardo, N.J.)

Filed Nov. 14, 1955, Ser. No. 546,757

2 Claims. (Cl. 88—24)

My invention relates generally to projectors for animated advertising displays and specifically to projectors of that general type in which the display consists of a plurality of beams of light each modified by chromatic abberation.

It is among the objects of my invention to provide an animated advertising display in which the colors of the spectrum impart an attractive appearance.

It is a further object of my invention to provide an animated advertising display in which a plurality of figures in constant motion or still make up a pleasingly varied display.

It is yet a further object of my invention to provide an animated advertising display which may be incorporated in a case.

Yet a further object of my invention is to provide an animated advertising display which is compact and portable.

A still further object of my invention is to provide a projector for animated advertising displays which incorporates a plurality of beams of light in motion combined with spectrum colors.

Among the further objects of my invention is to provide a projector for animated advertising displays which is automatic, simple, relatively inexpensive, easy to maintain, and durable.

These objects and advantages, as well as other objects and advantages, may be achieved by the device illustrated in the appended drawing in which:

Figure 1 is a view in perspective showing my projector for animated advertising displays from the left;

Figure 2 is a view in perspective showing the projector from the right;

Figure 3 is a view of a fixed light lattice;

Figure 4 is a view of a light mask;

Figure 5 is a view of a rotatable light lattice;

Figure 6 is a view of a fixed light lattice;

Figure 7 is a view of a fixed light lattice; and

Figure 8 is a view of a rotatable light lattice.

Referring now to the drawings in detail, my projector 11 for animated advertising displays comprises a base 12. Mounted on the base at one end is a support 13 to which is attached a socket 14 for a projection lamp 15. Mounted on a bracket 16 immediately in front of the projection lamp is a condenser 17 preferably of heat-resistant glass. Beyond the bracket 16 is another bracket 18. The center of this bracket 18 has an opening 19 for light to pass through. At the rear of the bracket 18 a pair of strips 20—20 defining a slot for receiving and holding a display element 21. Such a display element may take many forms and may be in the form of a fixed light lattice 22 having a plurality of elongated, horizontally disposed apertures, or may be simply an opaque square 24 having a central cut-out portion 25 in the form of a star or any other selected design, which design will merely be a matter of choice. The display element 21 may be a combination light lattice 26 plus a message (such as the one shown in Figure 6). Any selected light lattice might be substituted and held in place between the uprights 20 so as to suitably modify the light passing through the opening 19 in the bracket 18. Immediately beyond the bracket 18 is a pair of motor-mounting brackets 27. On each of these brackets, there is mounted a motor 28 each having a shaft 29 which extends through the bracket 18. These shafts have threaded ends 30 adapted to receive wing nuts 31. When the motors 28—28 are energized, the shafts revolve. If a light lattice 32 is threaded on to the motor shaft, and if a display member 33 is attached to the other motor shaft, varying modifications of light passing through the aperture 19 in the bracket 18 will be achieved. A rotatable light lattice such as the one shown in Figure 5 is a light lattice 32 formed of opaque material, such as metal, having a plurality of regularly disposed star-shaped apertures. Each of these apertures will break up the light source into a small beam of light which moves. While I have shown a star design, this is merely a matter of choice, for many other designs may be selected. A transparent disk 33 mounted on the other motor shaft in overlapping relation with the light lattice 32 may have various designs, opaque in character, applied thereto. For example, a square of small stars 34 or a square of small opaque bars 35 or a printed message 36 may be used. When any of these opaque portions of the display member 33 coincide with apertures in the light lattice 32, that portion of the light lattice will be masked and no light will pass through, thereby superimposing upon a field of moving light beams, a "blackout" or obscuration of a portion of that field so that a message or a departure from the fixed design of the light lattice will become apparent to those viewing the field. For example, a field of small rotating moving stars may have a sufficient number of stars blacked out to define the area delineating the message "Merry Christmas." Similar obscuration of the design field of the light lattice may be accomplished for innumerable other effects as will be obvious from a consideration of the square of stars 34 or the square of elongated bars 35. In addition, a substantial portion of the field may be permanently masked, as for example, by the insertion of the mask 24 between the uprights 20 or the light lattice 22 between the uprights 20, or as one of many other alternatives, the light mask consisting of the star apertures and the message, as shown in Figure 6. Another possible method could be the use of a tinted mask, either fixed or rotatable, or a square light lattice 37 which may, for example, be colored red. Thus it will be seen that the rotating light lattice 32 gives a moving field of light beams. The display member 33 may mask parts of this field on a rotating basis or a light lattice 22 may permanently mask a portion of the field to impart a permanent stationary pattern to the beam of light projected.

Immediately beyond the motors 28—28 is another upright bracket 38 which has a focusing lens 39 centrally mounted in an aperture thereon. The bracket 38 is slidably mounted in tracks 40 so that the focusing lens 39 may bring the projected image in focus on the screen on which it may appear. Immediately beyond the bracket 38 is a platform 41 attached to the bracket 38; on this, there, movably positioned prisms 42 are mounted. These prisms 42 are positioned in holders which have extended portions 43. Bolts 44 enable the positioning of these prisms at various angles to interrupt the beam of light passing through the focusing lens 39 so as to impart to each one of them, individually, a marginal chromatic area due to dispersion of each of the individual beams of light.

It will be seen that the innumerable beams of light passing through the focusing lens 39 will each have imparted thereto a marginal spectrum-like quality. A mirror 45, which is adjustable as to angle, is provided so that the beams emerging from the prisms may be directed to any desired quarter.

It is to be noted that in addition to the use of a fixed light lattice, such as 22, a tinted or colored member may be substituted between the uprights 20 so that the transmitted beam will have a color characteristic.

It is to be further noted that the movable light lattice 22 may have innumerable designs applied thereto.

It is to be further noted that the movable display members 33 may, in addition to having opaque portions and designs, have tinted portions or may have an overall tint or tints which will be imparted to the light beam passing through it.

While I have shown two prisms 42, it is not necessary that there be two for there may be one or more dependent upon the amount of dispersion desired to be applied to the individual light beams. Lenses, and other means may also accomplish this result. While I have shown two motors, it is understood that one motor will be sufficient to supply a pattern of moving beams of light, each individual beam of which undergoes the mutation of dispersion. The additional motor merely supplies an interruption of or modification of the light lattice beams by blanking out certain of them, by varying certain of them, or by imposing a written message or color overlying the field.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:

1. A projector for producing animated advertising displays comprising a base, a light source mounted on the base, a light condensing means in front of the light source, a continuously moving light mask in light intercepting relationship to a light beam emitted from the condensing means, said mask being a transparent member having opaque designs applied thereto, a continuously moving light lattice in light intercepting relationship to the light beam emitted from the condensing means, said light lattice being an opaque member having a plurality of apertures therein, the light lattice and light mask being mounted for movement in overlapping relationship to each other with the apertures on the light lattice and the opaque designs on the light mask overlapping the simultaneously transmit one portion and obliterate another portion of the light beam emitted from the condensing means, means for continuously moving the light mask and light lattice, a focusing lens in front of the light lattice and light mask, and light dispersion means in front of the focusing lens.

2. A projector for producing animated advertising displays comprising a base, a light source mounted on the base, a light condensing means in front of the light source, a continuously rotating light mask in front of the condensing means, said light mask being a transparent disc having opaque designs applied thereto, a continuously rotating light-lattice in front of the light mask, said light-lattice being an opaque disc having a plurality of apertures therein, said light mask and light-lattice having separate centers of rotation and being mounted in overlapping relationship to each other with the apertures on the light lattice and the opaque designs on the light mask overlapping to simultaneously transmit a portion and obliterate another portion of the light emitted from the condensing means, means for rotating the light mask and the light-lattice, a focusing lens in front of the light-lattice, and light dispersion means in front of the focusing lens.

References Cited in the file of this patent

UNITED STATES PATENTS

| | | |
|---|---|---|
| 719,771 | Evans | Feb. 3, 1903 |
| 770,766 | Menchen | Sept. 27, 1904 |
| 966,267 | Swensson | Aug. 2, 1910 |
| 1,228,685 | Magowan | June 5, 1917 |
| 1,238,882 | Buhlmann | Sept. 4, 1917 |
| 1,370,870 | Zurawecki | Mar. 8, 1921 |
| 1,698,013 | De Zeng | Jan. 8, 1929 |
| 2,341,223 | Lillie | Feb. 8, 1944 |
| 2,351,238 | Teuber | June 13, 1944 |
| 2,379,534 | Lowden | July 3, 1945 |
| 2,418,436 | Talbot | Apr. 1, 1947 |
| 2,742,813 | Zeininger | Apr. 24, 1956 |